(12) United States Patent
Bunker et al.

(10) Patent No.: US 6,994,016 B1
(45) Date of Patent: Feb. 7, 2006

(54) SEALED SYSTEM AND CONTINUOUS PROCESS FOR MAKING FOOD PRODUCTS

(75) Inventors: LaRue Bunker, Rigby, ID (US); Kyle E. Dayley, Rigby, ID (US)

(73) Assignee: Miles Willard Technologies, LLP, Idaho Falls, ID (US)

(*) Notice: Subject to any disclaimer, the term of this patent is extended or adjusted under 35 U.S.C. 154(b) by 0 days.

(21) Appl. No.: 10/158,463

(22) Filed: May 30, 2002

Related U.S. Application Data (60) Continuation-in-part of application No. 09/932,504, filed on Aug. 17, 2001, now abandoned, which is a continuation of application No. 09/548,136, filed on Apr. 12, 2000, now abandoned, which is a division of application No. 09/277,777, filed on Mar. 29, 1999, now Pat. No. 6,197,358.

(51) Int. Cl.
*A23N 12/06* (2006.01)

(52) U.S. Cl. .................. 99/348; 99/352; 99/443 C; 99/470; 99/472; 99/479; 99/483

(58) Field of Classification Search ............. 99/348, 99/352, 443 R, 443 C, 470–472, 479, 483
See application file for complete search history.

(56) References Cited

U.S. PATENT DOCUMENTS

| | | | |
|---|---|---|---|
| 2,374,587 A | | 4/1945 | Weerth |
| 2,759,832 A | | 8/1956 | Cording et al. |
| 2,780,552 A | | 2/1957 | Willard et al. |
| 2,870,020 A | | 1/1959 | Ashley |
| 3,012,897 A | | 12/1961 | Sullivan |
| 3,458,325 A | | 7/1969 | Beck |
| 3,574,643 A | | 4/1971 | Lewis |
| 3,615,724 A | * | 10/1971 | Sech .......... 426/438 |
| 3,622,355 A | | 11/1971 | Beck |
| 3,634,105 A | | 1/1972 | Beck et al. |
| 3,725,087 A | | 4/1973 | Miller et al. |
| 3,764,716 A | | 10/1973 | Rainwater et al. |
| 3,830,949 A | | 8/1974 | Shatila |
| 3,886,291 A | | 5/1975 | Willard |
| 3,968,260 A | | 7/1976 | Shatila et al. |
| 3,975,549 A | | 8/1976 | Shatila et al. |

(Continued)

FOREIGN PATENT DOCUMENTS

AU 9857372 A * 9/1998

(Continued)

OTHER PUBLICATIONS

Frank Boyle, Potato Processing, 1987, p. 443-462, 470-506.*

(Continued)

*Primary Examiner*—Drew Becker
(74) *Attorney, Agent, or Firm*—Stephen A. Gratton (57) ABSTRACT

A system and a process for making food products, such as dehydrated potato products, with reduced water usage, and reduced waste water production, are provided. The system includes a precooker, a cooler and a cooker having sealed process chambers in flow communication with one another, and augers for moving the food product through the process chambers. In addition, valves seal the process chambers, and transfer the food product between the process chambers at a controlled rate. The process includes the steps of precooking the food product using steam, cooling the food product using vacuum cooling and conduction cooling in combination, and then cooking the food product using steam. The process also includes the steps of moving the food product at the controlled rate using the valves, and mixing the food product during the precooking, cooling and cooking steps.

30 Claims, 7 Drawing Sheets

U.S. PATENT DOCUMENTS

| | | |
|---|---|---|
| 3,987,207 A | 10/1976 | Spaeti et al. |
| 3,991,222 A | 11/1976 | Beck et al. |
| 3,997,684 A | 12/1976 | Willard |
| 4,005,139 A | 1/1977 | Kortschot et al. |
| 4,073,952 A | 2/1978 | Standing et al. |
| 4,107,345 A | 8/1978 | MacDonald et al. |
| 4,156,032 A | 5/1979 | Kluge et al. |
| 4,241,094 A | 12/1980 | O'Neil et al. |
| RE31,982 E | 9/1985 | Beck et al. |
| 4,660,468 A * | 4/1987 | Goldhahn .................... 99/470 |
| 4,708,159 A | 11/1987 | Lockwood, Jr. |
| 4,770,893 A | 9/1988 | Kluge et al. |
| 4,797,292 A | 1/1989 | DeWitt |
| 4,800,090 A | 1/1989 | August |
| 4,828,856 A | 5/1989 | Willard |
| 4,875,344 A * | 10/1989 | Zittel .......................... 62/381 |
| 4,946,704 A | 8/1990 | DeWitt |
| 5,071,661 A | 12/1991 | Stubbs |
| 5,284,085 A * | 2/1994 | Palm .......................... 99/348 |
| 5,292,542 A | 3/1994 | Beck et al. |
| 5,298,707 A | 3/1994 | Sprecher et al. |
| 5,392,698 A | 2/1995 | Sprecher et al. |
| 5,447,734 A | 9/1995 | Street |
| 5,707,671 A | 1/1998 | Beck et al. |
| 5,718,935 A | 2/1998 | Laufer |
| 5,750,165 A | 5/1998 | Erway |
| 5,789,006 A | 8/1998 | Jones |
| 6,017,576 A | 1/2000 | Klossner et al. |
| 6,066,353 A | 5/2000 | Martines-Serna Villagran et al. |
| 6,177,116 B1 | 1/2001 | Villagran et al. |
| 6,197,358 B1 | 3/2001 | Bunker et al. |

FOREIGN PATENT DOCUMENTS

| | | |
|---|---|---|
| GB | 1187762 | 4/1970 |
| JP | 408332048 A | 12/1996 |
| WO | WO 82/02652 | 8/1982 |
| WO | WO 98/00036 | 1/1998 |

OTHER PUBLICATIONS

Boyle, Frank. Potato Processing, Dehydrated Mashed Potatoes-Potato Granules, pp. 443-462.

Boyle, Frank. Potato Processing, "Dehydrated Mashed Potatoes-Potao Flaking", pp. 470-506.

* cited by examiner

SEALED SYSTEM AND CONTINUOUS PROCESS FOR MAKING FOOD PRODUCTS

CROSS REFERENCE TO RELATED APPLICATIONS

This application is a continuation-in-part of Ser. No. 09/932,504, filed on Aug. 17, 2001, abandoned, which is a continuation of Ser. No. 09/548,136, filed on Apr. 12, 2000, abandoned, which is a division of Ser. No. 09/277,777, filed on Mar. 29, 1999, U.S. Pat. No. 6,197,358.

FIELD OF THE INVENTION

This invention relates generally to food processing, and particularly to a sealed system, and to a continuous process, for making food products, that use less water, produce less waste water and provide improved products.

BACKGROUND OF THE INVENTION

Most processed food products require some type of cooking during processing. For example, dehydrated vegetables require cooking during the dehydration process. Potato flakes and potato granules are two well known dehydrated vegetable products.

Various processes for making dehydrated vegetables, are also well known in the art. Typically, these processes involve precooking raw slices, cooling the precooked slices and then cooking the cooled slices. In the past, the precooking, cooling and cooking steps have been performed using large quantities of water. As water resources become more limited and more expensive, water is becoming a significant issue for food processors.

Water is not only difficult to obtain, but waste water is also difficult to dispose of in an environmentally safe manner. For example, waste water with high concentrations of organic material can contaminate ground water used for municipal and rural water supplies. Also, decomposing organic material in the waste water produces by-products, such as methane gas, that can affect air quality.

In view of the foregoing, the present invention is directed to a system and to a process for making food products in which water usage and waste water production are substantially reduced. In addition, the system and process of the invention provide food products having improved flavor and texture characteristics.

SUMMARY OF THE INVENTION

In accordance with the present invention, a system and a process for making food products are provided. The system and the process perform precooking, cooling and cooking steps of a food making process in a sealed atmosphere, at a controlled rate, and with little water consumption. In an illustrative embodiment the system and the process are configured to make dehydrated potato products, such as flakes and granules.

The system includes a precooker, a vacuum cooler, and a cooker. The precooker, vacuum cooler and cooker are jacketed vessels having sealed process chambers in sealed flow communication with one another. In addition, augers move the product through the process chambers, and transfer mechanism move the product between the process chambers, at a controlled rate.

The precooker and the cooker include steam injection ports designed to inject and diffuse steam into their process chambers. Each steam injection port includes a temperature sensor and a valve in signal communication with a controller. Each controller can be programmed with a target temperature, and is configured to open or close the valves for the steam injection ports to maintain the target temperature. Steam heating in the precooker and the cooker minimizes damage and leaching of flavor components from the food product.

The process chamber of the cooler is in flow with a vacuum source such that air can be evacuated rapidly from the process chamber. Vacuum cooling can thus occur by the rapid evaporation of water vapor within the process chamber of the cooler. This type of vacuum cooling is also referred to as "evaporative" cooling. The process chamber of the cooler is also jacketed, such that a liquid cooling medium, such as cooled water, can be introduced into the jacket. "Conduction" or "contact" cooling can thus occur by contact of the product with the walls of the process chamber of the cooler.

With the system, water usage and waste water production are substantially reduced. A significant reduction in water usage and waste water production results from performing the precooking step using steam, rather than hot water in liquid form, as in conventional processes. Additional significant reductions result from performing the cooling step using vacuum cooling and conduction cooling, rather than with cool water in liquid form, as in conventional processes.

The system also minimizes damage to the food product and leaching of flavor and texture components by prolonged contact with water in liquid form as in conventional processes. Also, effluents from the precooking and cooking step remain in the process chambers and intermingle with the product improving the flavor and texture of the finished product.

The process includes the steps of precooking the food product using steam, cooling the food product using vacuum cooling and conduction cooling in combination, and then cooking the food product using steam. The process also includes the steps of moving the food product at the controlled rate using the valves, and mixing the food product during the precooking, cooling and cooking steps.

For making dehydrated potato products, the process includes the steps of washing, peeling, and slicing raw potatoes to form potato slices. The process also includes the step of precooking the potato slices in steam to a temperature of about 160° F. (71.1° C.) for a time period of about 15–30 minutes. In addition, the process includes the step of cooling the precooked potato slices using vacuum cooling, and conductive cooling to a temperature of about 70° F. (21.1° C.) or less, and a vacuum of about −0.1 bar to −0.9 bar, for about 15–30 minutes or more. The process also includes the step of cooking the cooled potato slices in steam to a temperature of about 198° F. (92.2° C.) or greater for about 15–40 minutes.

For making potato flakes, following the cooking step, a ricing step is performed in which the cooked slices are riced to form a potato mash. Additives, such as emulsifiers, antioxidants, flavorings and color stabilizers, can then be added to the mash. Next, a drying step is performed in which the mash is dried to form potato sheets having a moisture content of about 6%–8%. The potato sheets are then comminuted using a hammermill, or other suitable comminuting apparatus into the potato flakes.

For making potato granules, following the cooking step, mash mixing, conditioning, screening, partial drying and final drying steps are performed.

BRIEF DESCRIPTION OF THE DRAWINGS

FIG. 1AA is a cross sectional view taken along line 1AA—1AA of FIG. 1A;

FIG. 1AB is a cross sectional view taken along line 1AB—1AB of FIG. 1AA;

DETAILED DESCRIPTION OF THE PREFERRED EMBODIMENTS

Figure 1:
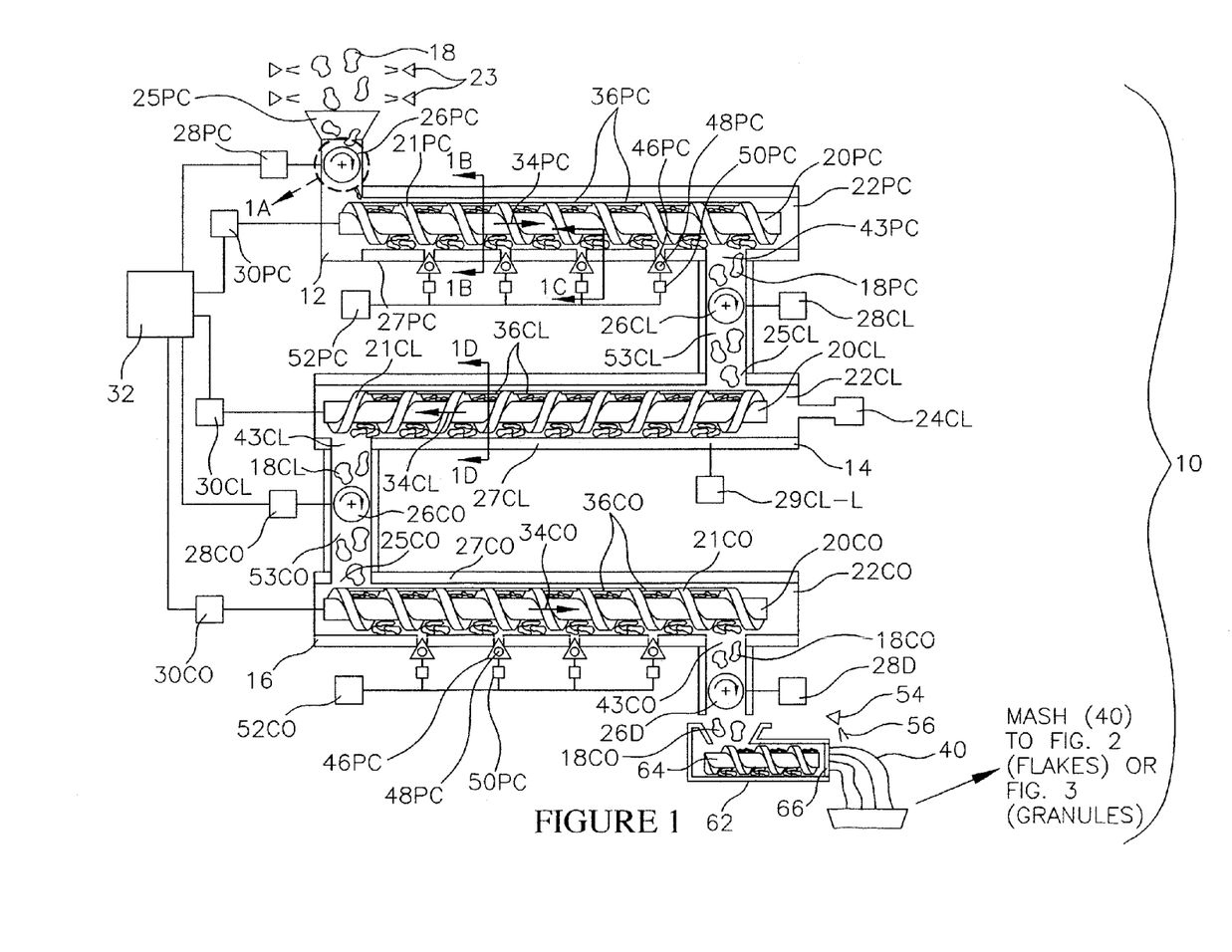
FIG. 1 is a schematic view of a system for making food products constructed in accordance with the invention.

Referring to FIG. 1, a system 10 and a process for making food products in accordance with the invention are illustrated. The system 10 includes a precooker 12, a vacuum cooler 14 and a cooker 16. In the illustrative embodiment, the system 10 and the process are configured to precook, cool and cook potato slices 18, for making dehydrated potato products such as potato flakes and potato granules. However, the system 10 can also be used to precook, cool and cook other vegetable, fruit or meat products in the production of other processed food products.

For making dehydrated potato products, raw (uncooked) potatoes (not shown) are received from the field or storage and are sorted. Sorting may be accomplished using inspection tables, or other sorting mechanisms, that are known in the art. In addition, the potatoes can be washed and scrubbed using a scrubbing apparatus to remove dirt and peel the potatoes. One suitable scrubbing apparatus is referred to as a "scrubber" and is manufactured by Van Mark of Iowa. Optionally, the potatoes can be steam peeled using a peeler, such as one manufactured by Idaho Steel Products, of Idaho Falls, Id.

Next, the washed and scrubbed potatoes are fed into a slicing apparatus (not shown) to form the potato slices 18. The slicing apparatus can comprise a commercial vegetable slicing and dicing apparatus, such as one manufactured by Urschel Laboratories Inc. of Valparaiso, Ind. A representative thickness of the potato slices 18 can be from about 0.250 inches to 0.65 inches (0.634 cm–1.651 cm). Alternately, rather than being formed by a slicing apparatus, the slices 18 can comprise small whole potatoes or portions thereof.

Next, the potato slices 18 can be transferred to holding tanks for further processing and optionally rinsed, using a rinser 23, to remove excess starch. Following the rinsing step, the potato slices 18 are loaded into the precooker 12 for a precooking step. During the precooking step, the potato slices 18 are heated to a temperature of about 158° F. to 165° F. (70.0° C.–73.9° C.) for about 15–30 minutes to form precooked potato slices 18PC. These process parameters are sufficient to partially gelatinize the starch within the potato cells, but not break the intercellular bonds between the potato cells or rupture the cell walls. One test for determining that the precooking step has been performed for a sufficient time period, is to break the potato slices 18PC and check for gelatinized starch strings in the middle portions thereof.

The precooker 12 comprises an elongated, sealed, jacketed, metal, tubular member oriented along a generally horizontal axis relative to the ground. The precooker 12 includes an inlet opening 25PC for receiving the potato slices 18, and a process chamber 22PC where the potato slices 18 are heated for a selected time period by exposure to live steam. The precooker 12 also includes an inlet valve 26PC (first valve) near the inlet opening 25PC configured to meter the potato slices 18 into the process chamber 22PC. The inlet valve 26PC also seals the process chamber 22PC from the atmosphere during loading of the potato slices 18 into the process chamber 22PC, and admits a metered quantity of air into the process chamber 22PC.

In the illustrative embodiment the inlet valve 26PC is a rotary-type valve driven by a variable frequency drive 28PC. However, other types of valves can be used in place of a rotary-type valve. In this regard any valve that provides a pressure seal while allowing a quantity of the potato slices 18 to be moved at a required rate (e.g., pounds of potatoes per hour) can be used. Another valve that can be used for the inlet valve 26PC is a slidable-type valve known in the art as a double slide-valve.

Similarly, the variable frequency drive 28PC for the inlet valve 26PC can be constructed as required to provide a variable speed for the inlet valve. For example, the variable frequency drive 28PC can comprise a conventional electric or hydraulic drive motor constructed to rotate with a selected revolutions per minute. The variable frequency drive 28PC, as well as other components of the system 10, are in signal communication with a control panel 32 (FIG. 1) for the system 10.

Figure 1A:
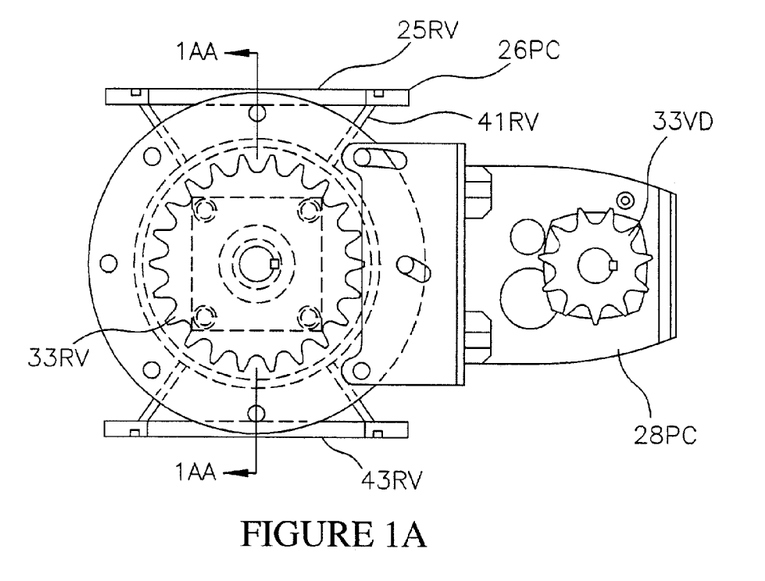
FIG. 1A is an enlarged view of a valve of the system taken along line 1A of FIG. 1.

As also shown in FIG. 1A, the inlet valve 26PC includes a drive sprocket 33RV that is coupled by a chain (not shown) to a drive sprocket 33VD on the variable frequency drive 28PC. As shown in FIG. 1AA, the inlet valve 26PC includes a housing 41RV having an inlet opening 25RV and an outlet opening 43RV. As also shown in FIG. 1AA, the drive sprocket 33RV for the inlet valve 26PC is attached to a drive shaft 39RV, that is rotatably mounted to bearings 37RV on the housing 41RV. The drive shaft 39RV is attached to a sealed drum 47RV that rotates within the housing 41RV with the torque applied by the variable frequency drive 28PC.

As shown in FIG. 1AB, the sealed drum 47RV has a hollow interior portion 51RV, and an opening 49RV to the interior portion 51RV. Rotation of the sealed drum 47RV moves the opening 49RV into alignment with the inlet opening 25RV such that potato slices 18 and air can be admitted into the interior portion 51RV of the drum 47RV. In addition, rotation of the sealed drum 47RV another 180° moves the opening 49RV into alignment with the outlet opening 43RV such that the potato slices 18 and air in the interior portion 51RV deposit into the process chamber 22PC of the precooker 12. The sealed drum 47RV can be operated to rotate at a revolutions per minute that moves a quantity of potato slices 18 through the system 10 at a controlled rate (e.g., 300 pounds per hour or greater).

Referring again to FIG. 1, the precooker 12 includes an auger 20PC configured to receive the potato slices 18 from the inlet valve 26PC, and to move the potato slices 18 through the process chamber 22PC to form precooked potato slices 18PC. The flow direction of the precooked potato slices 18PC through the process chamber 22PC is indicated by flow arrow 34PC.

The auger 20PC is rotatably mounted within the process chamber 22PC, and is driven by an auger drive 30PC. The auger drive 30PC can comprise a conventional electric or hydraulic drive motor configured to rotate at a selected revolutions per minute. The rotation of the auger 20PC can be selected relative to the rotation of the inlet valve 26PC such that the precooked potato slices 18PC are moved through the process chamber 22PC at about the same controlled rate as the inlet valve 26PC meters the raw potato slices 18 into the system 10. In addition, the rotation of the auger 20PC, and the length of the process chamber 22PC can be selected to achieve a desired precooking time in the process chamber 22PC. By way of example, the precooking time can be from 15–30 minutes.

The auger 20PC for the precooker 12 includes a continuous spiraled auger flute 21PC configured to push the precooked potato slices 18PC through the process chamber 22PC. The process chamber 22PC includes an outlet opening 43PC, and the auger flute 21PC pushes the precooked potato slices 18PC to the outlet opening 43PC. At the outlet opening 43PC, the precooked potato slices 18PC drop by gravity into a sealed conduit 53CL in flow communication with the cooler 14. For the gravity feed to work, the precooker 12 can be stacked on the cooler 14 such that the precooker 12 is above the cooler 14. In addition, the longitudinal axis of the cooler 14 is generally parallel to that of the precooker 12, and the longitudinal axis of the sealed conduit 53CL is generally perpendicular to that of the precooker 12 and the cooler 12.

Figures 1B, 1C, 1D:
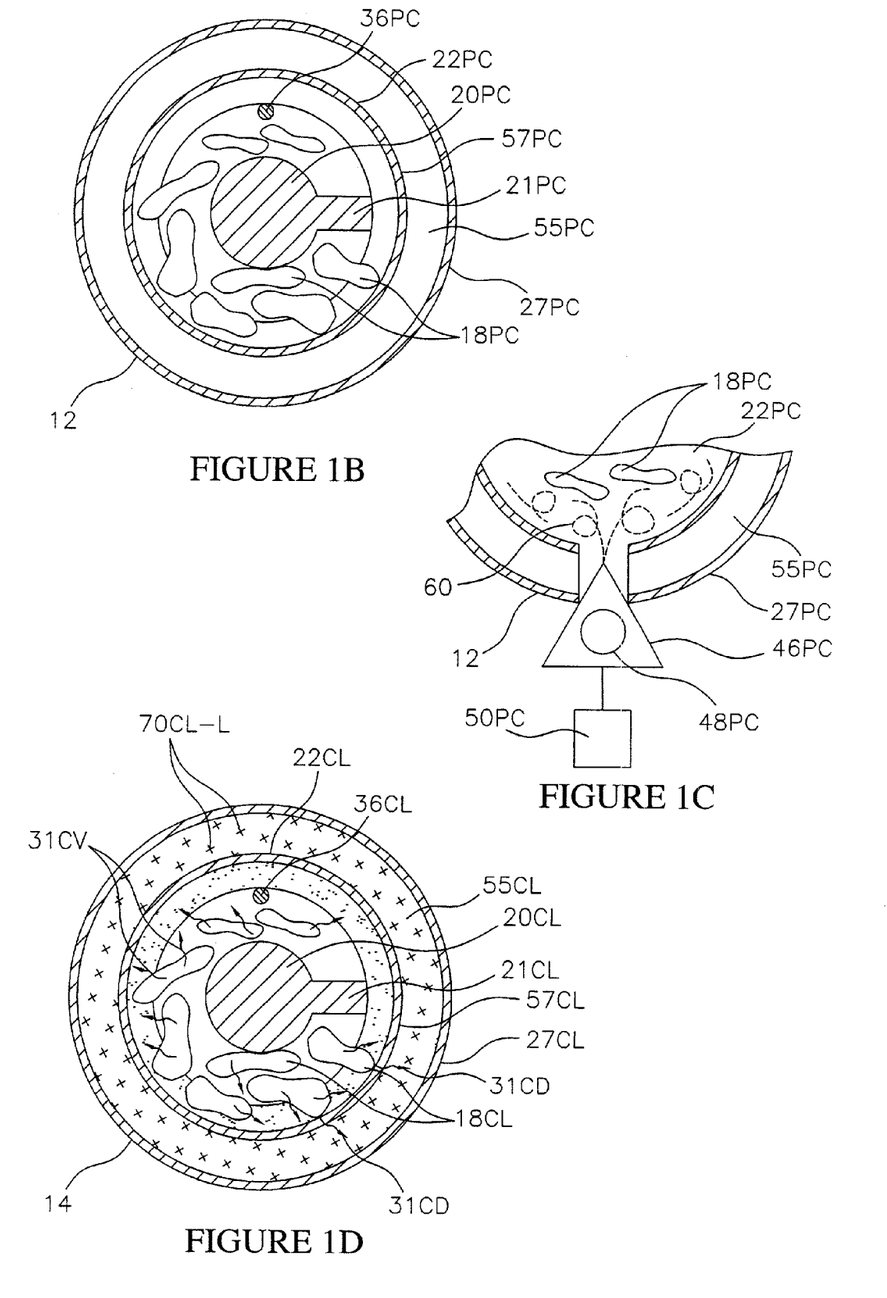
FIG. 1B is an enlarged cross sectional view of a precooker of the system taken along line 1B—1B of FIG. 1.
FIG. 1C is an enlarged cross sectional view of a steam injection port of the system taken along line 1C—1C of FIG. 1.
FIG. 1D is an enlarged cross sectional view of a cooler of the system taken along line 1D—1D of FIG. 1.

As shown in FIG. 1B, the auger 20PC also includes horizontal mixing bars 36PC between the flights of the auger flute 21PC. The mixing bars 36PC are attached to the auger flute 21PC along an axis generally parallel to the longitudinal axis of the precooker 12. The mixing bars 36PC are configured to mix the precooked potato slices 18PC, as they are moved through the process chamber 22PC by the auger flute 21PC. As shown in FIG. 1B, the precooker 12 also includes a jacket 27PC, which forms a sealed annular area 55PC surrounding the sidewalls 57PC of the process chamber 22PC. The jacket 27PC and sealed annular area 55PC help to thermally insulate the process chamber 22PC.

As shown in FIG. 1C, the precooker 12 also includes steam injection ports 46PC in fluid communication with the process chamber 22PC. Each steam injection port 46PC comprises a nozzle configured to inject and diffuse live steam 60 into the process chamber 22PC to heat the precooked potato slices 18PC. A temperature sensor 48PC is operatively associated with each steam injection port 46PC, and is configured to measure the temperature in the process chamber 22PC in an area proximate to the steam injection port 46PC.

Each steam injection port 46PC also includes a controller valve 50PC in fluid communication with a steam source 52PC (FIG. 1). The controller valve 50PC is in signal communication with the temperature sensor 48PC, and is configured to meter the flow of steam to the steam injection port 46PC as a function of the temperature measured by the temperature sensor 48PC. The steam injection ports 46PC and controller valves 50PC can thus be operated to achieve a selected temperature range within the process chamber 22PC (e.g., 158° F. to 165° F. (70.0° C.–73.9° C.)).

The precooker 12 can also include one or more drains (not shown) for draining liquid condensate from the process chamber 22PC. The precooker 12 can also include one or more exhaust valves (not shown) configured to relieve pressure in the process chamber 22PC at a selected pressure. The pressure within the process chamber 22PC can be maintained at a range of about 0 to 3 bar.

Using the precooker 12, the precooking step can be controlled to minimize damage to the potato cells, and to minimize leaching of flavor components from the potato cells by contact with water. Also, water usage is substantially reduced as compared to conventional processes that employ hot water in liquid form to precook the potato slices. Similarly, waste water from the precooking step is substantially reduced.

In addition, because the process chamber 22PC is a sealed vessel, effluents produced during the precooking step can be retained in the process chamber 22PC. As used herein, the term "effluent" refers to a solution comprising water and various compounds found in a food (e.g., potato cells, potato starch, sugars, minerals). Some of these compounds are soluble, and some are present as particulate or solid materials within the solution. These effluents are produced continuously during the operation of the system 10.

Effluents collected during the precooking step, and the cooling and cooking steps as well, can be used to enhance the flavor of the precooked potato slices 18PC. Alternately, effluents can be collected and disposed of in a waste treatment plant, or collected and used as a flavor enhancer for another potato product such as potato flake for making potato snacks.

Referring again to FIG. 1, following the precooking step, a cooling step is performed using the cooler 14. During the cooling step, the precooked potato slices 18PC are cooled to retrograde gelatinized starch in the potato cells. The cooling step can be accomplished by cooling the precooked potato slices 18PC to a temperature of about 75° F. (23.9° C.) or less, and holding for up to 30 minutes or longer.

The cooler 14 comprises an elongated, sealed, jacketed, metal, tubular member oriented along a longitudinal axis which is generally parallel to the longitudinal axis of the precooker 12. The cooler 14 includes an inlet opening 25CL for receiving the precooked potato slices 18PC from the precooker 12, and a process chamber 22CL where the precooked potato slices 18PC are cooled to the selected temperature for the selected time period.

The cooler 14 also includes a first transfer valve 26CL in the sealed conduit 53CL configured to meter the flow of the precooked potato slices 18PC into the process chamber 22CL of the cooler 14. The first transfer valve 26CL can be constructed substantially as previously described for the inlet valve 26PC, and is driven by a variable frequency drive 28CL, also as previously described. However, the first transfer valve 26CL can comprise any valve constructed to maintain a pressure seal while allowing the potato slices 18PC to move at a desired rate. The precooked potato slices 18PC drop by gravity through the sealed conduit 53CL and the first transfer valve 26CL into the inlet opening 25CL.

The cooler 14 includes an auger 20CL configured to receive the precooked potato slices 18PC from the first transfer valve 26CL, and to move the precooked potato slices 18PC through the process chamber 22CL to form cooled potato slices 18CL. The flow direction of the cooled potato slices 18CL through the process chamber 22CL is indicated by flow arrow 34CL.

The auger 20CL is rotatably mounted within the process chamber 22CL, and is driven by an auger drive 30CL. The auger drive 30CL can comprise a conventional, electric or hydraulic drive motor configured to rotate at a selected revolutions per minute. The rotation of the auger 20CL can be selected such that the cooled potato slices 18PC are moved through the process chamber 22CL at the selected rate.

The auger 20CL includes a continuous spiraled auger flute 21CL as previously described for auger 20PC. The process chamber 22CL includes an outlet opening 43CL, and the auger flute 21CL pushes the cooled potato slices 18CL to the outlet opening 43CL. The auger 20CL includes horizontal mixing bars 36CL (FIG. 1D) as previously described for mixing the cooled potato slices 18CL.

As shown in FIG. 1, at the outlet opening 43CL, the cooled potato slices 18CL drop by gravity into a sealed conduit 53CO in flow communication with the cooker 16. The sealed conduit 53CO also includes a second transfer valve 26CO and variable frequency drive 28CO which function as previously described for inlet valve 26PC and the first transfer valve 26CL. For the gravity feed to work, the cooler 14 can be stacked on the cooker 16 such that the cooler 14 is above the cooker 16. In addition, the longitudinal axis of the cooker 16 is generally parallel to that of the cooler 14, and the longitudinal axis of the sealed conduit 53CO is generally perpendicular to that of the cooler 14 and the cooker 16.

The process chamber 22CL for the cooler 14 is sealed by the operation of the transfer valves 26CL and 26CO. The process chamber 22CL is in flow communication with a vacuum source 24CL, such as a vacuum pump, configured to evacuate the process chamber 26 to a vacuum within the range of from about −0.1 bar to −0.9 bar.

As shown in FIG. 1D, evaporative cooling 31CV of the cooled potato slices 18CL occurs as surface water transforms from the liquid phase to the vapor phase. Every pound of water removed from the cooled potato slices 18CL, corresponds to approximately 970 BTUs of heat removed. The vacuum in the process chamber 22CL allows the transformation from the liquid to the vapor phase to occur more easily.

In addition to evaporative cooling, the cooler 14 is configured to perform conduction or contact cooling on the cooled potato slices 18CL. In particular, as shown in FIG. 1, a jacket 27CL of the cooler 14 forms a sealed annular area 55CL, which is in flow communication with a liquid cooling source 29CL-L. The liquid cooling source 29CL-L is configured to circulate a liquid coolant 70CL-L (FIG. 1D) such as chilled water, at a temperature of about 36° F. to 40° F. (2.22° C.–4.44° C.), through the jacket 27CL.

As shown in FIG. 1D, contact of the cooled potato slices 18CL with the sidewalls 57CL of the process chamber 22CL produces conduction cooling 31CD of the cooled potato slices 18CL to the liquid coolant 70CL-L. The cooled potato slices 18CL are thus subjected to evaporative cooling 31CV with vacuum, and also to conductive cooling 31CD by contact with the sidewalls 57CL of the process chamber 22CL. In addition, the liquid coolant 70CL-L circulating in the jacket 27CL helps to remove heat from the process chamber 22CL and from the cooled potato slices 18CL during evaporative cooling 31CV. Also, as the jacket 27CL is a sealed vessel, the liquid coolant 70CL-L can be recirculated, such that no waste water is produced by the cooling process.

Using evaporative cooling and conduction cooling in combination, the cooling step can be controlled to retrograde starches, to strengthen the potato cell walls, and to minimize leaching of flavor components from the potato cells by contact with water. Further, water usage and waste water production during the cooling step are substantially eliminated. In comparison, conventional cooling processes performed using water in liquid form, require significant quantities of water, and produce significant quantities of waste water. In addition, because the process chamber 22CL of the cooler 14 is a sealed vessel, the effluents produced during the cooling step may be retained in the process chamber 22CL, and flavor components retained during the cooling step.

Following the cooling step, the cooled potato slices 18CL are cooked to form cooked potato slices 18CO. The cooking step can be accomplished by heating the cooled potato slices 18CL to a temperature of about 190° F. to 212° F. (87.8° C. to 100° C.) for about 15–60 minutes.

As shown in FIG. 1, the system 10 includes the cooker 16 which is configured to perform the cooking step. The construction of the cooker 16 is substantially similar to that of the precooker 12. As such the cooker 16 comprises an elongated, sealed, jacketed, metal, tubular member having a longitudinal axis generally parallel to the longitudinal axis of the precooker 12 and cooler 14.

The cooker 16 includes an inlet opening 25CO in flow communication with the second transfer valve 26CO, a process chamber 22CO configured to heat the cooked potato slices 18CO, and an auger 20CO configured to move the cooked potato slices 18CO through the process chamber 22CO in a direction indicated by flow arrow 34CO. The auger 20CO is rotatably mounted within the process chamber 22CO, and is driven by an auger drive 30CO. In addition, the auger 20CO includes an auger flute 21CO and horizontal mixing bars (not shown) as previously described.

The cooker 16 also includes steam injection ports 46CO, temperature sensors 48CO, and controller valves 50CO in flow communication with a steam source 52Co as previously described. The steam injection ports 46CO and controller valves 50CO can be operated as previously described to achieve a selected temperature range within the process chamber 22CO (190° F. to 212° F. (87.8° C. to 100° C.)). The cooker 16 also includes one or more exhaust valves (not shown) configured to exhaust spent steam from the process chamber 22CO at a selected pressure. The pressure within the process chamber 22CO can be maintained at a range of about 0 bar to 3 bar.

The cooker 16 also includes an outlet opening 43CO and a discharge valve 26D configured to discharge the cooked potato slices 18CO. The discharge valve 26D is constructed substantially as previously described for inlet valve 26PC and transfer valves 26CL, 26CO and is driven by a variable frequency drive 28D. However, as with the previously described valves 26PC, 26CL, 26CO another type of valve such as a double slide valve can be used in place of a rotary valve.

During the cooking step, process parameters can be adjusted as required, such that the cooked potato slices 18CO are cooked to an appropriate degree. One factor affecting the cooking time is the potato solids content of the cooked potato slices 18CO. For monitoring the cooking process, samples can be evaluated using techniques that are known in the art. Also during the cooking step effluents from the cooked potato slices 18CO may be retained in the process chamber 22CO, and intermingled with the potato slices 18CO to improve flavor. In addition, flavor constituents are not leached away by contact with liquid water as with some prior art cooking processes. Further, using live steam substantially eliminates waste water production.

Following the cooking step, a mashing step is performed in which the cooked potato slices 18CO are riced to form a potato mash 40. For performing the mashing step, the system 10 can include a conventional ricing apparatus 62 in flow communication with the discharge valve 26D. The ricing apparatus includes a metal auger 64 for forcing the cooked potato slices 18CO through openings in a ricer plate 66. A representative solids content of the mash 40 can be from about 18% to 22%. A representative moisture content of the mash can be from about 78% to 82%.

Following the ricing step, an additive step is performed in which additives 56 are added to the mash 40 using techniques that are known in the art, such as direct spraying of a liquid solution using an additive dispenser 54 incorporated into the system 10. Suitable additives 56 include solutions of sodium bisulfite, and monoglyceride emulsifiers, antioxidants and chelating agents.

Figure 2:
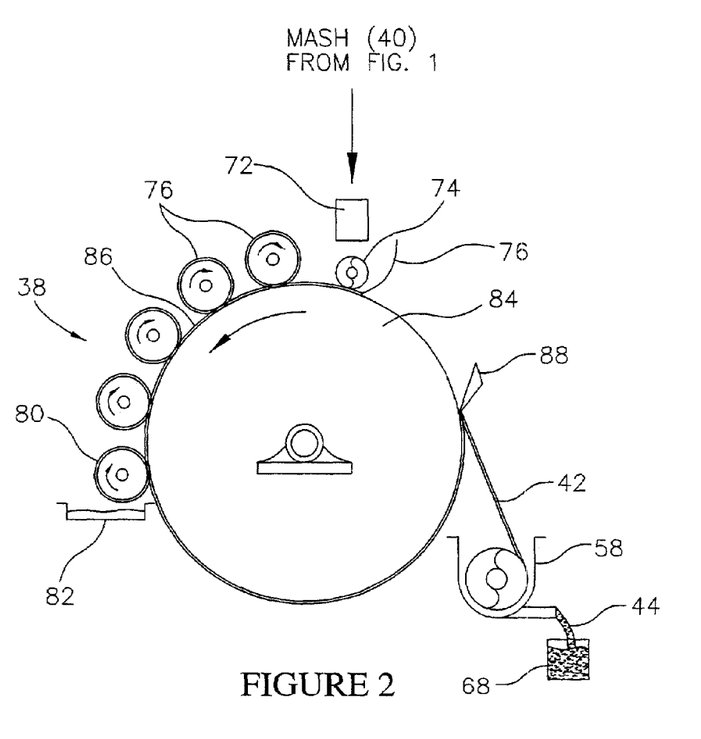
FIG. 2 is a schematic view of a drum drying apparatus for making dehydrated potato flakes using the system of FIG. 1.
Figure 3:
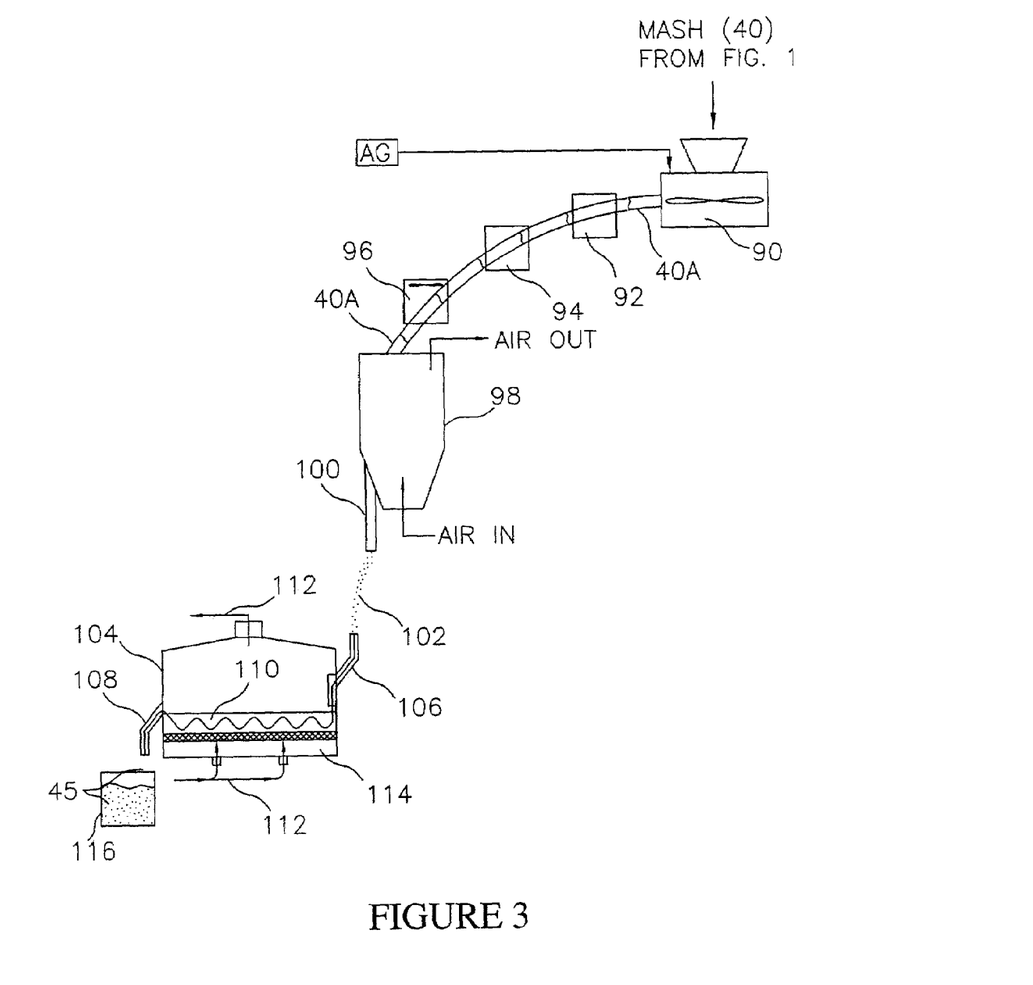
FIG. 3 is a schematic view of various apparatus for making dehydrated potato granules using the system of FIG. 1.

At this point of the process the mash 40 can be used to make either dehydrated potato flakes 44 (FIG. 2), or dehydrated potato granules 45 (FIG. 3). Also with regard to the potato flakes 44, FIG. 2 illustrates a drying step performed using a conventional drying apparatus in the form of a drum drier 38. Alternately, the drying step can be performed using other conventional drying apparatus. For example, another suitable drying apparatus is a pulse combustion energy system, as disclosed in U.S. Pat. No. 4,708,159 to Lockwood, Jr., entitled "Pulse Combustion Energy System", which is incorporated herein by reference.

As shown in FIG. 2, the drum drier 38 includes a large diameter rotatable drum 84 which is heated with pressurized steam. The drum drier 38 also includes a mash feed tube 72, a mash distribution screw 76, and a mash retainer 76. In addition, the drum drier 38 includes from four to six smaller diameter applicator rolls 78, whose surfaces rotate with a predetermined peripheral speed relative to the drum 84. Further, the drum drier 38 includes a direct accumulation roll 80, and a waste mash pan 82.

During operation of the drum drier 38, the mash 40 is fed by the mash distribution screw 74 onto the drum 84. As the mash 40 contacts the drum 84, a dried potato layer 86 forms on the drum 84. Each applicator roll 78 applies a layer of potato cells to the dried potato layer 86 passing below it, such that the finished potato sheet 42 has a thickness of from four to six layers of potato cells. A reciprocating doctor knife 88 peels the dried potato layer 86 from the drum 84 to form the potato sheet 42. Parameters of the drying step including drum speed, steam pressure, and mash solids can be controlled to form a potato sheet 42 with a desired thickness and density. A representative thickness of the potato sheet 42 can be from about 0.002 inches (0.05 mm) to 0.020 inches (0.51 mm). In addition, the mash 40 can be dried to form the potato sheet 42 (FIG. 2) with a moisture content of about 6% to 8%.

Still referring to FIG. 2, following the drying step, a comminuting step is performed in which the potato sheet 42 is comminuted into potato flakes 44. For performing the comminuting step, the system 10 can include a comminuting apparatus 58, such as a hammermill grinder. Following the comminuting step, the potato flakes 44 can be packaged as required in a suitable container 68.

Referring to FIG. 3, steps and equipment for making the dehydrated potato granules 45 are illustrated. In this case the mash 40 is fed into a mash mixing apparatus 90, such as a commercial mixture, configured to mix in dry add back potato granules AG until a homogeneous mash 40A is obtained. Alternately, the mash mixing apparatus 78 can be eliminated and the add back granules AG added to the ricer 62 (FIG. 1). In either case, the mash 40A includes add back potato granules AG.

Next, a conditioning step can be performed on the mash 40A using a conditioning apparatus 92 which is configured to hold or "temper" the mash 40A at a desired temperature for a desired time period. Parameters can be controlled during the conditioning step to cool the mash 40A to a temperature of about 75° F. (23.9° C.) or less. Following the conditioning step, a screening step can be performed using a screening apparatus 94. Following screening, further mixing can be performed using a mixing apparatus 96.

The cooled, conditioned and mixed mash 40A is then fed into a drying apparatus 98 such as an air lift dryer wherein partial drying is performed. The drying apparatus 98 includes an outlet 100 wherein partially dried potato particles 102 having a moisture content of about 12%–13% are discharged. At this point add back granules AG can be removed from the partially dried potato particles 102.

Following partial drying, the partially dried potato particles 102 are fed into a drying apparatus 104 for final drying to a moisture content of about 6% to 8%. The drying apparatus 104 is illustrated as a fluidized bed dryer comprising an inlet 106, an outlet 108 and a plenum chamber 110 wherein hot air 112 is directed through a fluidized bed 114 of potato particles 102. The potato granules 45 discharge from the outlet 108 of the drying apparatus 104 and can be packaged in a container 116.

Potato flakes 44 (FIG. 2) and potato granules 45 (FIG. 3) fabricated using the system 10 and process of the invention, are characterized by a flavor and rehydrated texture comparable to that of flakes and granules made using conventional methods which employ water in the precook and cool steps. In addition, water usage and waste water production are substantially reduced by the process of the invention. By way of example and not limitation, using the process of the invention waste water production can be reduced by as much as 60%.

Testing Procedures

Figure 4:
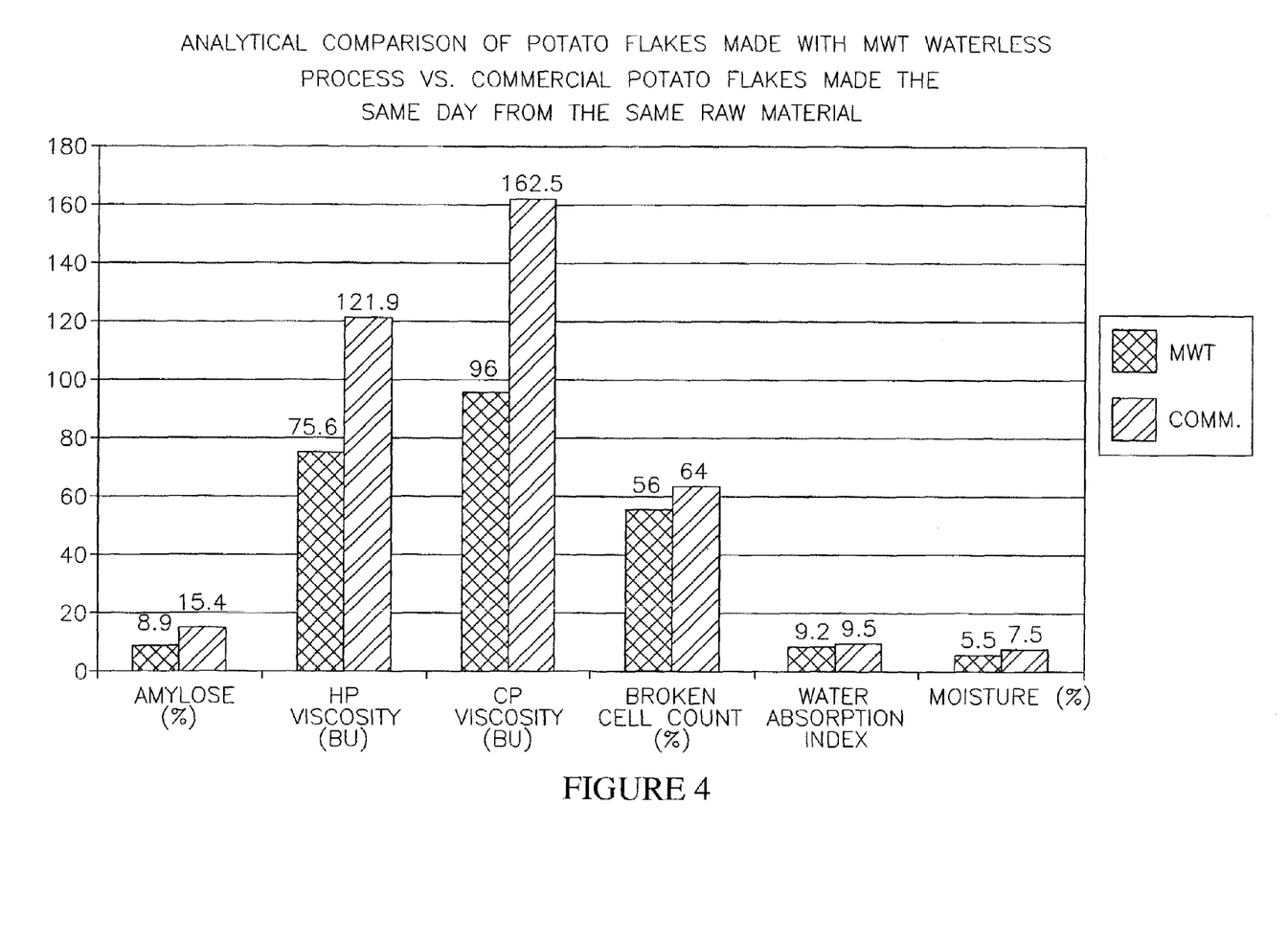
FIG. 4 is a bar graph comparing the physical characteristics of potato flakes made using the system and process of the invention to the physical characteristics of commercial potato flakes made by a conventional process.
Figure 5:
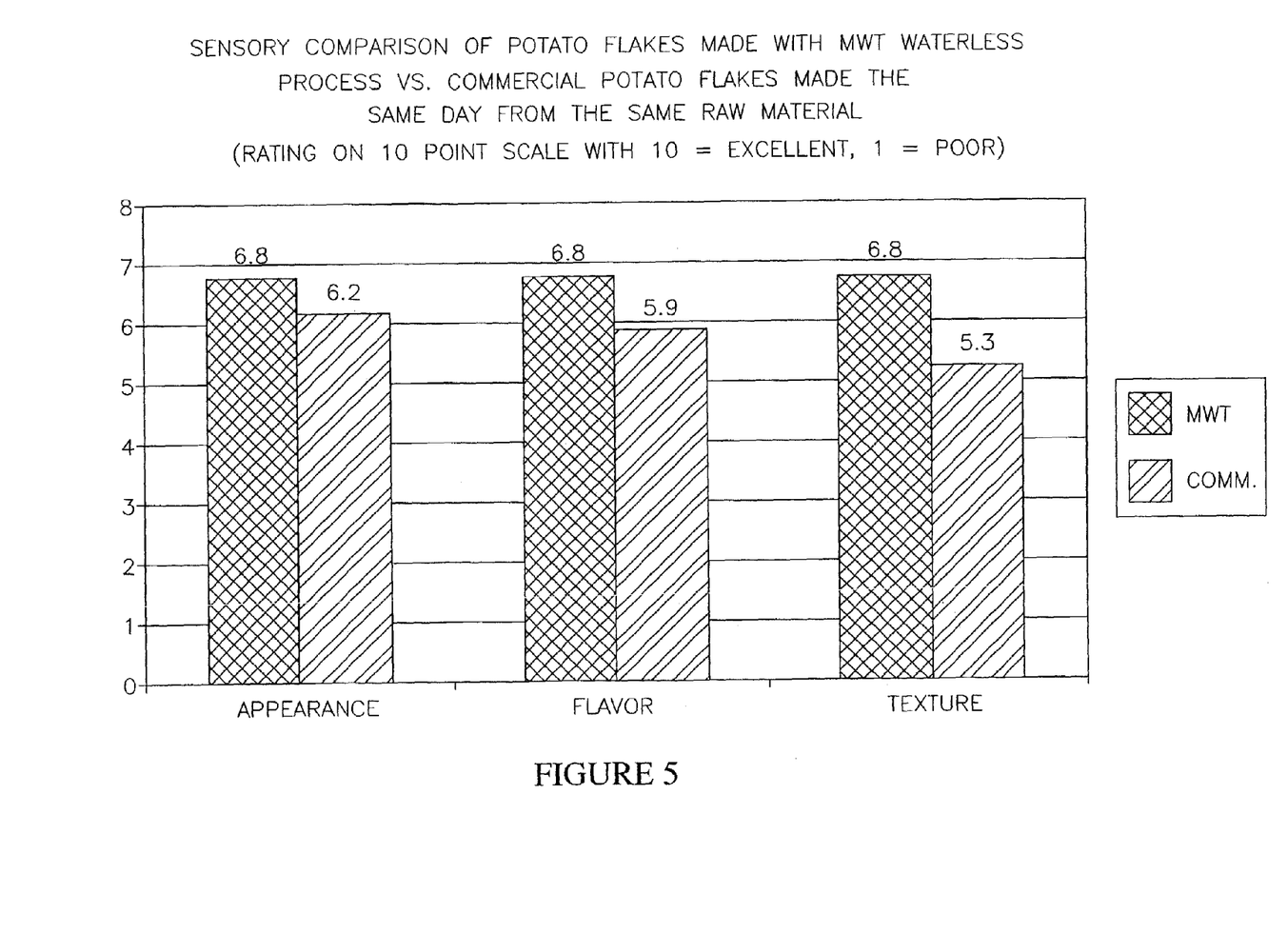
FIG. 5 is a bar graph comparing the sensory characteristics of potato flakes made by the system and the process of the invention to the sensory characteristics of commercial potato flakes made by a conventional process.

Potato flakes made using the system and the process of the invention were evaluated by various physical, chemical and sensory tests, and compared to conventional commercial potato flakes produced on the same day using the same potatoes and a conventional dehydration process. FIG. 4 illustrates the results of the analytical tests. FIG. 5 illustrates the results of the sensory tests.

In FIGS. 4 and 5, the cross hatched bars represent the potato flakes prepared by the system and the process of the invention. In the legend, the cross hatched bars are labeled MWT, which represents the assignee of the present application, Miles Willard Technologies, of Idaho Falls, Id. The diagonally hatched bars represent commercial potato flakes prepared using a conventional dehydration process.

Also in FIGS. 4 and 5, the vertical axes are a generic designation of the test results which are labeled in the hatched bars. The horizontal axes are divided into the different tests using the hatched bars. Methods used for testing are described below.

Moisture (%)

Moisture analysis measures the amount of drying completed on the drum dryer. The analysis is done using a vacuum oven at 70° C. for 16 hours. The target for standard flake is a moisture content between 6% and 8%. This provides product that is stable without scorching.

Broken Cell Count (%)

Broken cell count shows the damage to potato cells during processing. High levels of broken cells indicate that the product has been abused by not properly precooking cooling, cooking or grinding. These high levels result in product that has sticky texture and lacks the desired dry, mealy texture of fresh mashed potato. The broken cell count test is done by mixing 0.5 grams of dehydrated flakes with 20 ml of distilled water and allowing the mixture to set for 30 minutes. One drop of the rehydrated solution is placed in the well of a microscope slide, a slip cover placed over it and the total number of cells and the number of broken cells are counted using a 100× light microscope. Cells are determined to be broken if the cell wall is discontinuous.

Water Absorption Index (WAI)

Water absorption index (WAI) is a measurement of the ability of the dehydrated potato flakes to absorb and hold water. The WAI is affected by the level of precooking, cooling, cooking and grinding. The test is done by mixing 2 grams of dehydrated potato flakes with 30 ml of distilled water and holding for 30 minutes in a 30° C. waterbath. The solution is centrifuged for 15 minutes at 3000 RPM and the supernatant immediately decanted off. The weight of the tube is subtracted from the weight of the tube plus rehydrated flake (without supernatant) divided by the weight of the dry sample [(wt. rehydrated sample−wt. of tube)/wt. of dry sample].

U.S. Pat. No. 6,066,353 to Villagran et al., entitled "Dehydrated Potato Flakes", which is incorporated herein by reference, also describes a procedure for obtaining a water absorption index for potato flakes.

Amylose (%)

The percentage of amylose is an indicator of the level of free starch or amount of damage to the potato cells during processing. The higher the level, the greater the cell damage. Amylose level is affected by precooking, cooling, cooking and grinding. The test is done by mixing a sample of flakes and 0.1 N sodium hydroxide. The mixture is set in a 65° C. water bath with occasional stirring for 30 minutes then filtered through Whatman #4 filter paper. One ml of the solution is transferred to a 25 ml volumetric flask and the volume made up with iodine solution. The absorbance is read at 700 nm on a spectrophotometer and the percentage of amylose calculated using a standard curve. The previously cited U.S. Pat. No. 6,066,353 to Villagran et al. describes a method for determining amylose levels for potato flakes.

HP Viscosity and CP Viscosity

"Hot Paste" and "Cold Paste" viscosities are determined using a Brabender Viscograph. Thirty grams of screened potato flakes (−20 to +40 US standard mesh size) are thoroughly mixed with 400 ml of 25° C. water. The mixture is transferred to a test cup, a Brabender head is lowered into the cup and the instrument turned on. The cup rotates at a rate of 75 rpm. The instrument is programmed to adjust the temperature of the mixture from 25° C. to 90° C. at a rate increase of 1.5° per minute. The mixture is held at 90° C. for 10 minutes and then cooled down to 50° C. The "Hot Paste Viscosity" is the viscosity at 90° C. after the 10 minute hold, and the "Cold Paste Viscosity" is read at 50° C. after the mixture has cooled down. The viscosity readings are recorded in Brabender Units (BU). The previously cited U.S. Pat. No. 6,066,353 to Villagran et al. describes a method for determining HP and CP viscosity for potato flakes.

Sensory Evaluation

Potato flakes are often rehydrated for use as mashed potatoes. The rehydrated product should have characteristics similar to that of the fresh potatoes and are evaluated for aroma, appearance, flavor and texture using trained panelists. The flakes are rehydrated using 95 grams of flakes added to 472 ml of 175° F. water and mixed on low speed using a Kitchen Aid mixer with the paddle attachment for 20 seconds.

The evaluation process uses a rating system for specific characteristics as described below. Each of four panelists evaluated and rated each product and the reported results are an average of these ratings.

A. Appearance: Intensity of each color; 0—no color; 9=intense color.
   Translucency; 0=very dry; 9=very watery.
B. Flavor: Intensity of overall flavor; 0=no flavor; 9=intense flavor.
C. Texture: Seven point texture grading system of overall texture as follows:
   1. Light and fluffy, similar to fresh potatoes in all respects.
   2. Very mealy, light and crumbly; breaks evenly.
   3. Mealy but more moist, not sticky, breaks evenly.
   4. Noticeably more moist and/or heavy, but not sticky.
   5. More moist and/or heavy, will not break easily but pulls out; has lost light, fluffy, crumbly character.
   6. Noticeably watery, heavy or sticky-will not break; rejected for commercial use.
   7. Very pasty, rubbery or watery; considerably worse than borderline rejection.

Results:

Potato flakes produced by the system and process of the invention were found to have sensory and analytical results which indicated a higher quality than conventional flakes. The potato flakes of the invention had a lower viscosity, broken cell count, and amylose levels, which indicated less damage to the potato cells. Less damage to the potato cells results in potato flakes that are less sticky and when rehydrated have a texture similar to fresh mashed potatoes.

Sensory scores confirmed the laboratory findings with a significantly higher rating for texture and moderately higher rating for appearance. The flavor was found, in all cases, to be superior to conventional potato flakes. The inventors have therorized that the improvement in potato flavor results from the decreased exposure of the potato flakes to water and the decreased leaching of flavor components by the water.

Other advantages of the system and process of the invention include:

1. Significant energy savings are achieved by the increased efficiency of the system and from reduced waste water disposal.

2. Potatoes can be evenly and effectively precooked to 160° F. using steam and cooled using vacuum and conduction cooling.

3. Potato flakes produced by the system and process of the invention have less cell damage, improved potato flavor, and rehydrate to an improved mashed potato.

4. Water usage reductions are significant in the precooking and cooling steps.

5. Wastewater reductions are significant in the precooking and cooling steps.

6. The system can be scaled up or down for different commercial applications with minimal design modifications.

7. Precooking and cooking times may be decreased by 25% and 50% respectively.

Thus the invention provides an improved system and process for making dehydrated potato products that substantially reduces water usage and the production of waste water. The system and process also employ vacuum cooling and contact conduction cooling in combination, rather than water cooling, to further reduce water usage, waste water production, and leaching of flavor components. The resultant potato products are characterized by a texture and flavor similar to, or better than that of potato products made using conventional processes.

Although the invention has been described with reference to certain preferred embodiments, as will be apparent to those skilled in the art, certain changes and modifications can be made without departing from the scope of the invention, as defined by the following claims.

What is claimed is:

1. A system for making a food product comprising:
   a precooker comprising a first process chamber configured to contain a precooking steam, the precooker configured to move the food product through the first process chamber and to precook the food product to a first temperature by contact with the precooking steam and condensate thereof but without contact with a liquid precooking water introduced into the first process chamber for precooking the food product;
   a cooler comprising a second process chamber in flow communication with the first process chamber having walls configured to contain a vacuum, and a jacket around the walls in flow communication with a liquid cooling source, the cooler configured to move the food product though the second process chamber and to evaporative cool and to conduction cool the food product to a second temperature without contact with a liquid cooling water introduced into the second process chamber for cooling the food product; and
   a cooker comprising a third process chamber in flow communication with the second process chamber configured to contain a cooking steam, the cooker configured to move the food product through the third process chamber and to cook the food product to a third temperature by contact with the cooking steam and condensate thereof but without contact with a liquid cooking water introduced into the third process chamber for cooking the food product.

2. The system of claim 1 further comprising a first sealed conduit between the precooker and the cooler configured to transfer the food product from the precooker to the cooler and a second sealed conduit between the cooler and the cooker configured to transfer the food product between the cooler and the cooker.

3. The system of claim 1 wherein the precooker is stacked on the cooler such that the food product transfers by gravity from the precooker to the cooler, and the cooler is stacked on the cooker such that the food product transfers by gravity from the cooler to the cooker, with the precooker and the cooker configured to move the food product in a first flow direction and the cooler configured to move the food product in an opposite second flow direction.

4. The system of claim 1 wherein the precooker, the cooler and the cooker each include an auger having a spiral flute configured to move the food product through the first process chamber in a first direction, the second process chamber in a second direction opposite to the first direction or the third process chamber in the first direction.

5. The system of claim 4 further comprising at least one mixing bar across the flute configured to mix the food product as the food product is moved by the auger through the first process chamber, the second process chamber or the third process chamber.

6. The system of claim 1 further comprising a first transfer mechanism between the precooker and the cooler configured to move the food product from the precooker to the cooler and a second transfer mechanism between the cooler and the cooker configured to move the food product between the cooler and the cooker.

7. The system of claim 1 wherein the food product comprises a dehydrated potato flake or a dehydrated potato granule.

8. A system for making a dehydrated potato product comprising:
   a precooker comprising a sealed first process chamber configured to contain a precooking steam at a selected pressure and to precook potato slices by exposure to the precooking steam to form precooked slices, the precooker comprising at least one precooking steam injection port configured to meter the precooking steam into the first process chamber as a function of a precooking temperature in the first process chamber;
   a cooler comprising a sealed second process chamber in flow communication with the first process chamber having walls configured to contain a vacuum and to circulate a liquid cooling medium, the cooler configured to evaporative cool the precooked slices by moving the precooked slices through the vacuum, and to conduction cool the precooked slices by moving the precooked slices into contact with the walls of the process chamber, to form cooled slices; and
   a cooker comprising a sealed third process chamber in flow communication with the second process chamber configured to cook the cooled slices by exposure to a cooking steam to form cooked slices, the cooker comprising at least one cooking steam injection port configured to meter the cooking steam into the third process chamber as a function of a cooking temperature in the third process chamber.

9. The system of claim 8 wherein the potato product comprises potato flakes.

10. The system of claim 8 wherein the potato product comprises potato granules.

11. The system of claim 8 further comprising a first transfer mechanism between the precooker and the cooler configured to transfer the precooked slices from the first process chamber to the second process chamber and a second transfer mechanism between the cooler and the cooker configured to transfer the cooled slices from the second process chamber to the third process chamber.

12. The system of claim 8 further comprising an inlet transfer mechanism configured to meter the potato slices into the first process chamber.

13. The system of claim 8 further comprising an outlet transfer mechanism configured to discharge the cooked slices from the third process chamber.

14. The system of claim 8 wherein the cooler comprises a jacket around the second process chamber in flow communication with the liquid cooling medium.

15. The system of claim 8 wherein the precooker comprises a plurality of precooking steam injection ports configured to diffuse the precooking steam into the first process chamber as a function of the precooking temperature in the first process chamber.

16. The system of claim 8 wherein the precooker, the cooler and the cooker each includes an auger having a spiral flute configured to move the precooked slices through the first process chamber, the cooled slices through the second process chamber or the cooked slices through the third process chamber.

17. The system of claim 16 wherein each auger includes a plurality of mixing bars across the spiral flute configured to mix the precooked slices moving through the first process chamber, the cooled slices moving through the second process chamber or the cooked slices moving through the third process chamber.

18. The system of claim 16 further comprising:
a ricer apparatus configured to rice the cooked slices to form a mash;
a drying apparatus configured to dry the mash to form a sheet; and
a comminuting apparatus configured to comminute the sheet into potato flakes.

19. The system of claim 16 further comprising:
a ricer apparatus configured to rice the cooked slices to form a mash;
a mixing apparatus configured to mix add back granules to the mash;
a first drying apparatus configured to dry the mash to form partially dried potato granules; and
a second drying apparatus configured to dry the partially dried potato granules into potato granules.

20. A system for making a dehydrated potato product comprising:
a precooker configured to precook potato slices by exposure to a precooking steam and condensate thereof but without contact with a liquid precooking water introduced into the precooker for precooking the potato slices;
a cooler comprising a process chamber having walls configured to contain a vacuum, a jacket around the walls in flow communication with a liquid cooling source, and an auger configured to move the potato slices through the process chamber and the vacuum and into contact with the walls; and
a cooker configured to cook the potato slices by exposure to cooking steam and condensate thereof but without contact with a liquid cooking water introduced into the cooker for cooking the potato slices;
the precooker, the cooler and the cooker configured to continuously perform a precooking step, a cooling step and a cooking step in a sealed atmosphere with contact between the food product and effluents produced during the precooking step and the cooking step.

21. The system of claim 20 wherein the precooker comprises a first elongated vessel stacked above the cooler and a first sealed conduit configured to move the potato slices by gravity into the cooler.

22. The system of claim 20 wherein the cooler comprises a second elongated vessel stacked above the cooker and a second sealed conduit configured to move the potato slices by gravity into the cooker.

23. The system of claim 20 wherein the cooker comprises a third elongated vessel.

24. The system of claim 20 wherein the auger comprises a plurality of mixing bars configured to mix the potato slices in the process chamber.

25. A system for making a dehydrated potato product comprising:
a precooker comprising a precooking process chamber configured to precook potato slices by exposure to a precooking steam and condensate thereof but without contact with a liquid precooking water introduced into the precooking process chamber for precooking the potato slices;
a cooler configured to vacuum cool and conduction cool the potato slices, the cooler comprising a cooling process chamber in flow communication with a vacuum source, a jacket surrounding walls of the cooling process chamber in flow communication with a liquid coolant, and a cooler auger configured to move the potato slices through the cooling process chamber to effect evaporative cooling, and to move the potato slices into contact with the walls to effect contact cooling;
a cooker comprising a cooking process chamber configured to cook the potato slices by exposure to a cooking steam and condensate thereof but without contact with a liquid cooking water introduced into the cooking process chamber for cooking the potato slices; and
a plurality of valves configured to seal the precooker, the cooler and the cooker, and to move the potato slices between the precooker and the cooler, and between the cooler and the cooker;
the precooker, the cooler, the cooker and the valves configured to perform a continuous process in which the potato slices are precooked, cooled and cooked in a sealed atmosphere.

26. The system of claim 25 wherein the precooker, the cooler and the cooker comprise elongated vessels stacked to permit gravity transfer of the potato slices.

27. The system of claim 25 wherein the precooker includes a precooker auger configured to move and mix the potato slices through the precooking process chamber.

28. The system of claim 25 wherein the cooker includes a cooker auger configured to move and mix the potato slices through the cooking process chamber.

29. The system of claim 25 further comprising:
a ricer apparatus configured to rice the potato slices to form a mash; and
a drying apparatus configured to dry the mash to form a sheet.

30. The system of claim 29 further comprising a comminuting apparatus configured to comminute the sheet into potato flakes.

* * * * *